(12) United States Patent
Meyer et al.

(10) Patent No.: US 6,998,804 B2
(45) Date of Patent: Feb. 14, 2006

(54) ELECTRIC MOTOR WITH ELECTRONIC BRAKE

(75) Inventors: Christoph Meyer, Stuttgart (DE); Christof Kress, Deizisau (DE); Alfred Schreiber, Kirchheim (DE)

(73) Assignee: C. & E. Fein GmbH & Co. KG (DE)

( * ) Notice: Subject to any disclaimer, the term of this patent is extended or adjusted under 35 U.S.C. 154(b) by 22 days.

(21) Appl. No.: 10/625,176

(22) Filed: Jul. 23, 2003

(65) Prior Publication Data

US 2004/0130282 A1 Jul. 8, 2004

(30) Foreign Application Priority Data

Jul. 23, 2002 (DE) .......................... 102 34 397

(51) Int. Cl.
H02P 3/00 (2006.01)

(52) U.S. Cl. .................. 318/362; 318/366; 318/501; 318/519

(58) Field of Classification Search ............. 318/362, 318/366, 367, 498, 501, 503, 519, 720
See application file for complete search history.

(56) References Cited

U.S. PATENT DOCUMENTS

| 3,340,449 | A | | 9/1967 | Elliot | |
|---|---|---|---|---|---|
| 3,872,363 | A | * | 3/1975 | Gross | .................. 318/762 |
| 4,239,978 | A | * | 12/1980 | Kofink | .................. 307/16 |
| 4,250,436 | A | * | 2/1981 | Weissman | .................. 318/245 |
| 4,311,948 | A | | 1/1982 | Brown et al. | |
| 4,417,191 | A | | 11/1983 | Schmidt | |
| 4,556,831 | A | * | 12/1985 | Sakamoto et al. | .......... 318/434 |
| 4,725,764 | A | * | 2/1988 | Prestel | .................. 318/258 |
| 4,857,818 | A | * | 8/1989 | Hobbs | .................. 318/762 |
| 5,041,771 | A | * | 8/1991 | Min | .................. 318/786 |
| 5,828,194 | A | | 10/1998 | Canova | .................. 318/290 |
| 5,903,130 | A | * | 5/1999 | Rice et al. | .................. 318/811 |
| 6,104,155 | A | * | 8/2000 | Rosa | .................. 318/381 |
| 6,236,177 | B1 | | 5/2001 | Zick et al. | .................. 318/362 |

FOREIGN PATENT DOCUMENTS

| DE | 36 36 555 | 5/1988 |
|---|---|---|
| DE | 38 02 419 | 8/1989 |
| DE | 4216838 A1 | 12/1993 |
| DE | 43 33 294 | 4/1995 |
| DE | 4333294 | 4/1995 |
| DE | 19651298 A1 | 6/1998 |
| EP | 0 578 366 A2 | 12/1994 |
| EP | 1 154 554 | 11/2001 |
| GB | 1484296 | 9/1977 |
| WO | 91/0386 | 3/1991 |

* cited by examiner

Primary Examiner—Rina Duda
(74) Attorney, Agent, or Firm—St. Onge Steward Johnston & Reens LLC

(57) ABSTRACT

A retarded electric motor designed as a series motor or an asynchronous motor having a squirrel cage rotor. A valve is provided for switching between motor operation and braking operation. During motor operation the motor is operated in a known configuration as series motor or as asynchronous motor. If configured as a series motor, the valve ($S_1$, $S_2$, $S_3$) allows to bypass the armature and to operate the motor as an externally excited direct current generator when switching into braking operation. If configured as an asynchronous motor, a switch is utilized to disconnect at least two field windings from mains. A valve is utilized to excite the motor externally from mains with a pulsating direct current during braking.

10 Claims, 8 Drawing Sheets

ELECTRIC MOTOR WITH ELECTRONIC BRAKE

Figure 1:
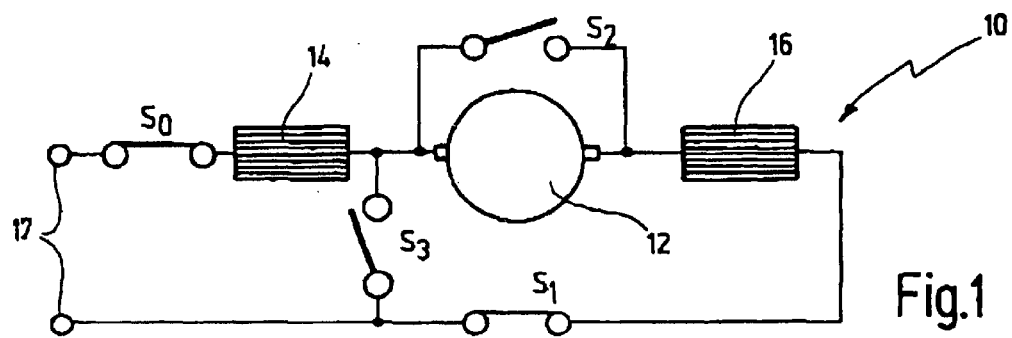

This application claims priority from pending German Patent Application No. 102 34 397.7 filed on Jul. 23, 2002.

BACKGROUND OF THE INVENTION

The invention relates to a retarded or electronically braked electric motor comprising at least one field winding and a commutating armature being connected in series with the at least one field winding and being fed during operating mode by a supply voltage, and further comprising means for switching into a braking mode.

The invention further relates to an electric motor configured as an asynchronous motor comprising a squirrel cage rotor.

A retarded or electronically braked electric motor as mentioned at the outset and designed as a series motor is known from WO 91/03866.

Herein, for braking the series motor, a closed circuit disconnected from the power supply is formed via the field windings, commutating windings and the armature when switching from operating mode into braking mode. For limiting the braking current, a connection is formed between the armature and a commutating winding, this being controlled by two Zener diodes connected inversely parallel.

For switching between operating mode and braking mode, a multiple pole reversing switch is necessary that must have a specific switching sequence to avoid a destruction of the switch by the forming of a light arc when switching quickly back and forth between operating mode and braking mode.

From DE 3 636 555 A1 another series motor has become known which shall offer a self-excited braking when switching from operating mode into braking mode. To guarantee an initiation of braking, a capacitor is provided that is charged during operating mode by means of a diode. When switching into braking mode, the braking is initiated by discharging the capacitor.

Also this electric motor requires a special multiple pole switch which must be designed so as to reliably disconnect the current circuit from the supply voltage, before the braking circuit is closed via one field winding and the armature. In addition, the utilization of a capacitor is seen as a disadvantage, since only one single capacitor discharge is possible, to initiate braking of the motor. If this should not be sufficient to effect a reliable initiation of the braking mode, then also later no braking will be possible, once the capacitor is discharged.

U.S. Pat. No. 5,828,194 to Canova discloses a control circuit of a DC series motor comprising two half bridges each with a respective switch with controlled opening and closing. The first half bridge connects a pole of the field winding to the battery and the second of the half bridge connects a pole of the armature to the battery. The control circuit is designed to feed power resulting from the braking operation back into the battery. To this end the armature must be pole reversed which is affected by contactors for reversing. However, the utilization of mechanical contactors for switching between an operating and a braking mode is considered a major disadvantage.

U.S. Pat. No. 6,236,177 to Zick et al. discloses a braking and control circuit for a series motor used in an electric power tool. A triac in series with the armature and field windings is controlled by a microcontroller for controlling the motor during operating mode and during braking mode. During braking mode the armature is bypassed by a triac also controlled by the microcontroller. However, since the design utilizes fast switching electronic components high excess voltages may arise there from which may impair the reliability of the motor.

In asynchronous motors comprising squirrel cage rotors, up to now no braking device has become known.

SUMMARY OF THE INVENTION

In view of this, it is a first object of the invention to disclose a retarded electric motor offering a reliable braking in a simple cost-effective way.

It is a second object of the invention to disclose a retarded electric series motor allowing a switching between an operating mode and a braking mode without utilizing any mechanical switch.

It is a third object of the invention to disclose a braking module designed for retrofitting into an existing electric series motor not designed for braking.

It is a forth object of the invention to disclose a retarded electric series motor having a high fail-safety.

It is a fifth object of the invention to disclose a retarded electric asynchronous motor having a squirrel cage rotor.

It is a sixth object of the invention to disclose a retarded electric series motor avoiding excess voltages resulting from fast switching electronic components.

It is a seventh object of the invention to disclose a retarded electric series motor avoiding any multiple pole switch requiring a specific switching sequence.

These and other objects of the invention are achieved with respect to a retarded or electronically braked electric motor configured as a series motor as mentioned at the outset in that the means for switching into braking mode allows for bypassing of the armature and for an external excitation of at least one field winding by means of the supply voltage, when being in braking mode.

During operating mode, the known circuit of an electric motor having its armature and field winding(s) in series is provided. To effect braking, the circuit via the armature and the field winding(s) is interrupted and at least one field winding is externally excited by the supply voltage, while the armature is bypassed. Thus, according to the invention, the motor is operated as an externally excited direct current generator to effect braking.

In this way, a reliable initiation of the braking is always guaranteed. In addition, a special multiple pole switch having a specific switching sequence is not necessary any more. By contrast, the desired switchover between operating mode and braking mode may be reached purely electronically, if desired.

With respect to the asynchronous motor having a squirrel cage rotor, this object is achieved with an asynchronous motor having at least two, preferably three, field windings, preferably in star connection, by providing means for switching into braking mode allowing a disconnection of at least two field windings from the supply voltage when switching into braking mode, wherein a controllable electronic switch is connected between at least two field windings, the controllable electronic switch acting as a free wheeling electronic switch during braking and being open during operating mode, wherein at least one, preferably two, field windings are externally excited by means of the supply voltage via a controllable electronic switch that is open during operating mode.

In total, the invention provides for a reliable braking of the electric motor in a particularly cost-saving way, while a high fail-safety is reached.

Basically, several options exist when the motor is designed a series motor, to effect a switchover according to the invention between operating mode, in which the armature and the field winding(s) are in series and fed by the supply voltage, and between braking mode in which the motor is operated as an externally excited direct current generator.

According to a first development of the invention, a free wheeling electronic switch is provided for limiting the voltage across the at least one field winding during braking mode.

In this way, excess voltages are avoided which may, in particular, result from fast switching electronic components, in particular in cooperation with inductances.

According to another development of the invention, means is provided for limiting the excitation current through the at least one field winding during braking mode.

In this way, the excitation current is prevented from rising too high.

According to a preferred embodiment of the invention, the series motor is provided with a controllable electronic switch for bypassing the armature and being connected across the armature during braking mode.

Also for controlling the excitation current through the at least one field winding, a controllable electronic switch may be provided.

An electronic switch in this application shall be regarded in general as a semi-conductor component having a suitable control, such as a triac, a thyristor, a transistor, in particular a field effect transistor, or the like. In the simplest case also a diode merely giving a preferred direction of current may be regarded as an electronic switch.

Herein, in particular an optical coupling device, such as an optical diode in combination with an optical triac, may be provided for driving the valve. Thereby a decoupling is effected between the control circuit and the current circuit to be switched, in which the controllable electronic switch is provided.

As far as desired also a switch having mechanical contactors or a relay could act as an electronic switch.

According to a further development of the invention, the controllable electronic switch connects the at least one field winding via a load resistance to the supply voltage when being in braking mode.

According to this very simple design, also a limitation of the external excitation via the at least one field winding is simply reached by means of a load resistance.

According to an improvement of this design, the controllable electronic switch connects the at least one field winding via a load resistance and at least one excitation winding to the supply voltage.

Since the excitation is given by the product of the number of turns and the current, a higher excitation may be reached at a respective number of turns, even at a considerably smaller current. Therefore, the load resistance may be designed with a higher value, whereby the power loss is reduced.

For controlling the motor during operating mode, according to a further design of the invention, a phase current control may be provided, whereby a switch, preferably designed as a triac, being in series with the at least one field winding and the armature, is controlled.

According to another embodiment of the invention, for controlling the motor during operating mode, a transistor, preferably a field effect transistor, is provided, preferably being driven by a pulse duration modulation (PWM) and, preferably, being in series with the at least one field winding and the armature.

Such a circuitry can easily be used, if the supply voltage is a direct voltage.

In case alternating voltage is utilized as supply voltage, then the transistor lying in the motor current circuit, is, preferably, connected via a rectifier, in particular, via a bridge rectifier, to the supply voltage and to the at least one field winding and the armature, respectively.

If desired, also a transistor driven by a pulse duration modulation can be utilized for controlling the motor current during operating mode as well as for controlling the braking current during braking mode, whereby the circuitry is simplified in general.

According to a further development of the invention, for controlling the motor during operating mode as well as during braking mode, a phase current control is utilized being driven by means of a switch configured, preferably, as a triac and being in series with the at least one field winding and the armature. Herein, the phase current control during braking mode only drives one half wave according to the necessary current direction during braking mode.

Thereby, fewer components are necessary. Also a space-saving arrangement at low losses can be reached.

If the electric motor according to the invention is designed as an asynchronous motor having a squirrel cage rotor, then the controllable electronic switches may for instance be designed as triacs that each are in series with a diode.

Preferably, herein the valve acting as a free wheeling electronic switch is operated at a current flow angle of 180° during braking mode, while the current flow angle of the electronic switch for external excitation can be controlled to a value of # 180° during braking mode.

In this way, a simple control is provided for controlling the intensity of braking.

It will be understood that the above-mentioned and following features of the invention are not limited to the given combinations, but are applicable in other combinations or taken alone without departing from the scope of the invention.

SHORT DESCRIPTION OF THE DRAWINGS

Figure 2:
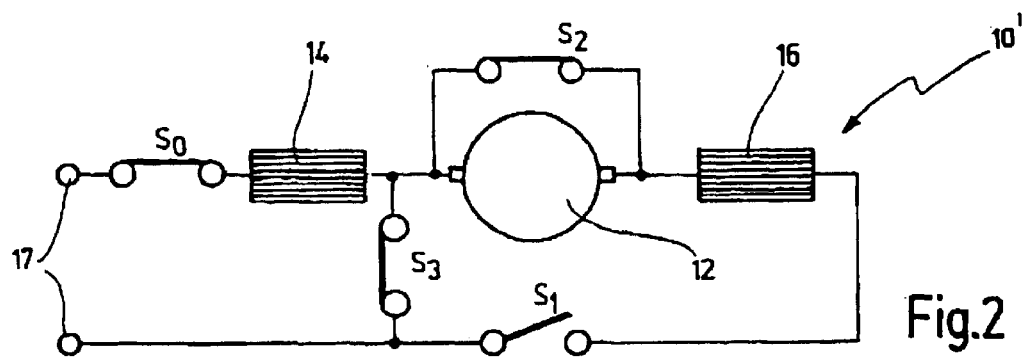
Figure 3:
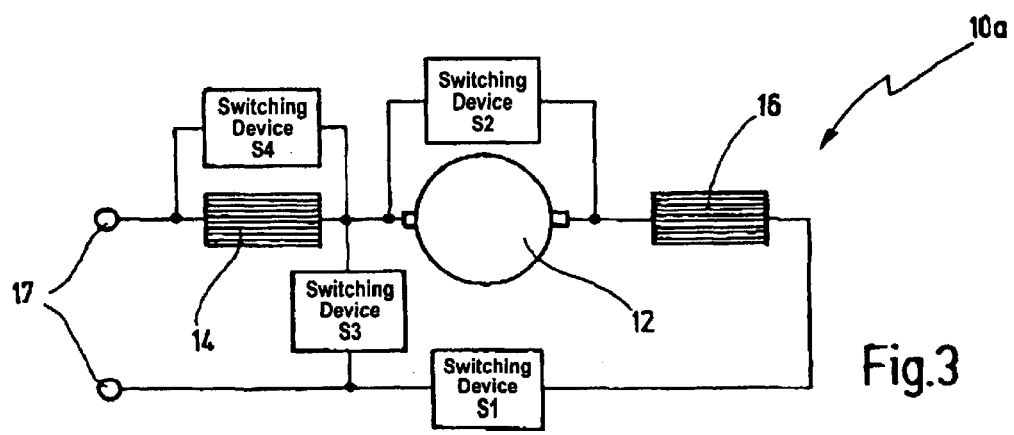
Figure 4:
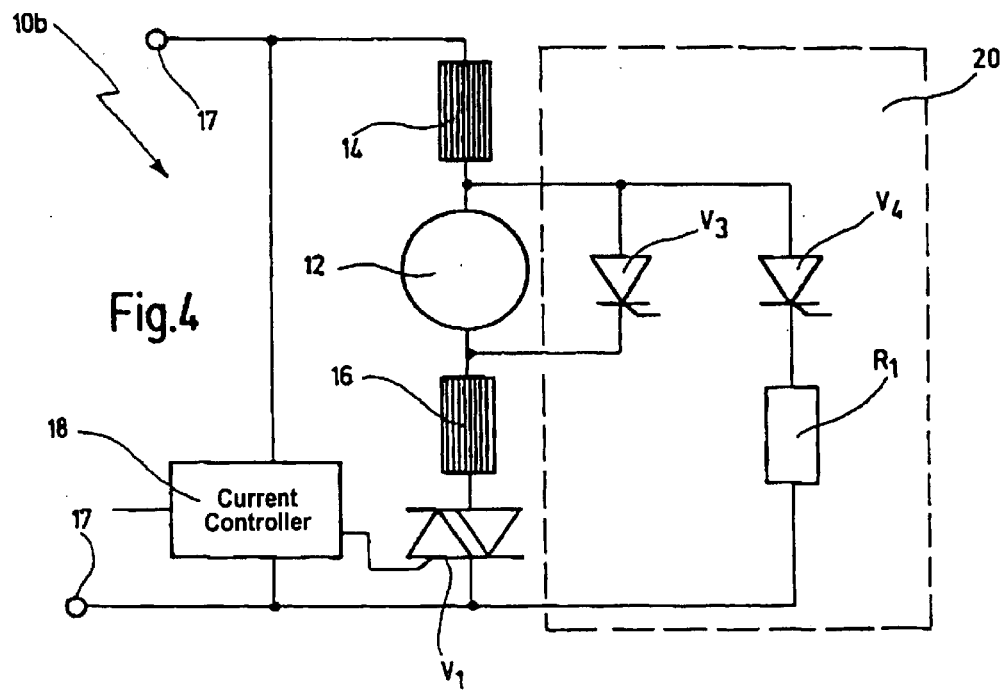
Figure 5:
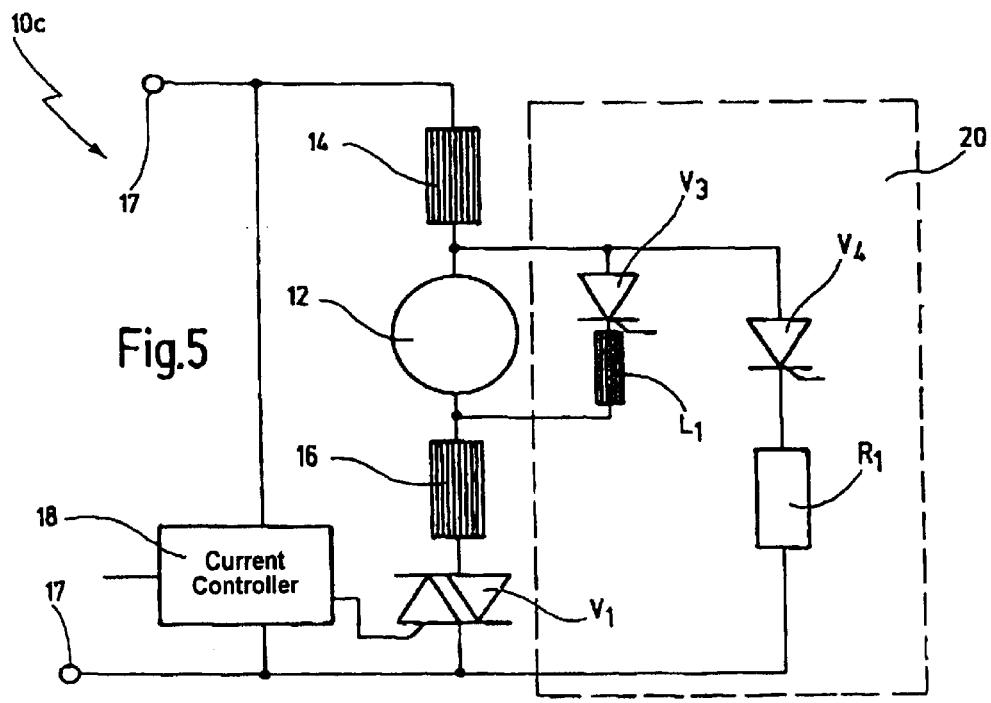
Figure 6:
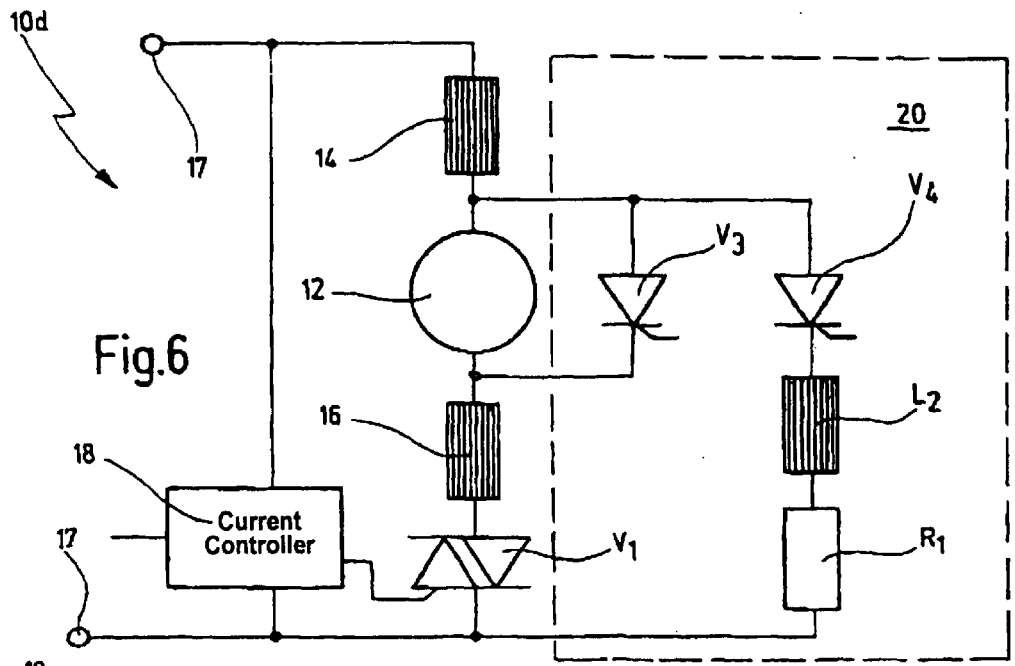
Figure 7:
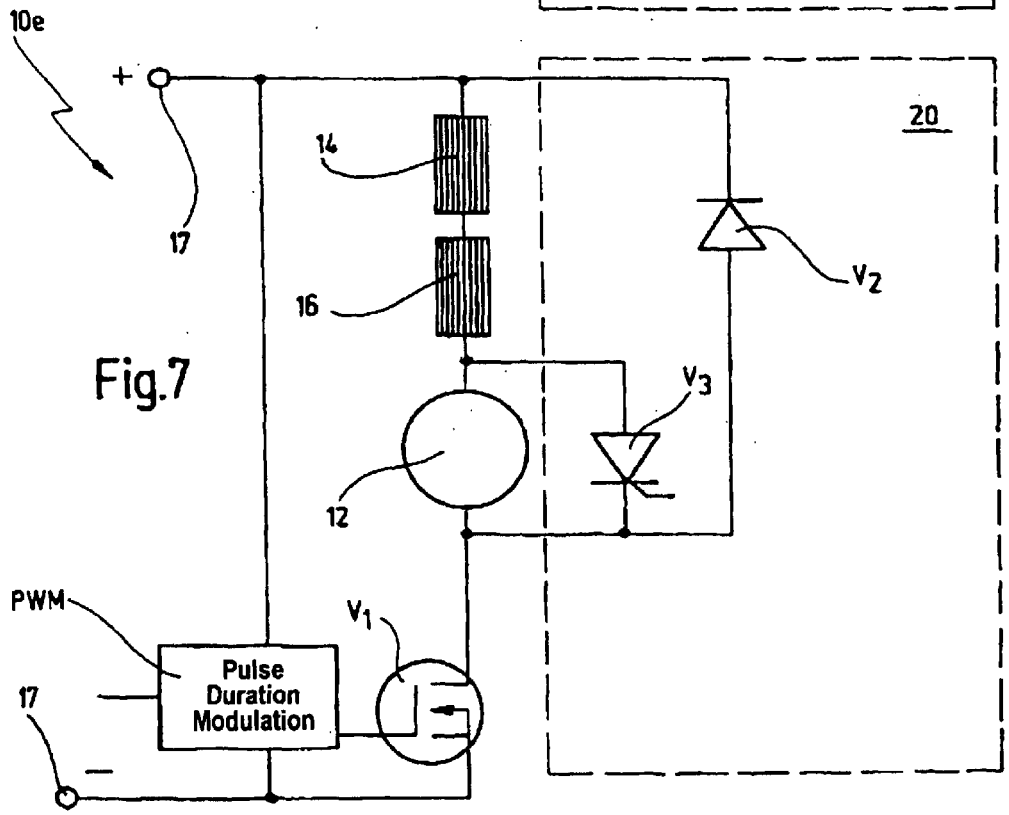
Figure 8:
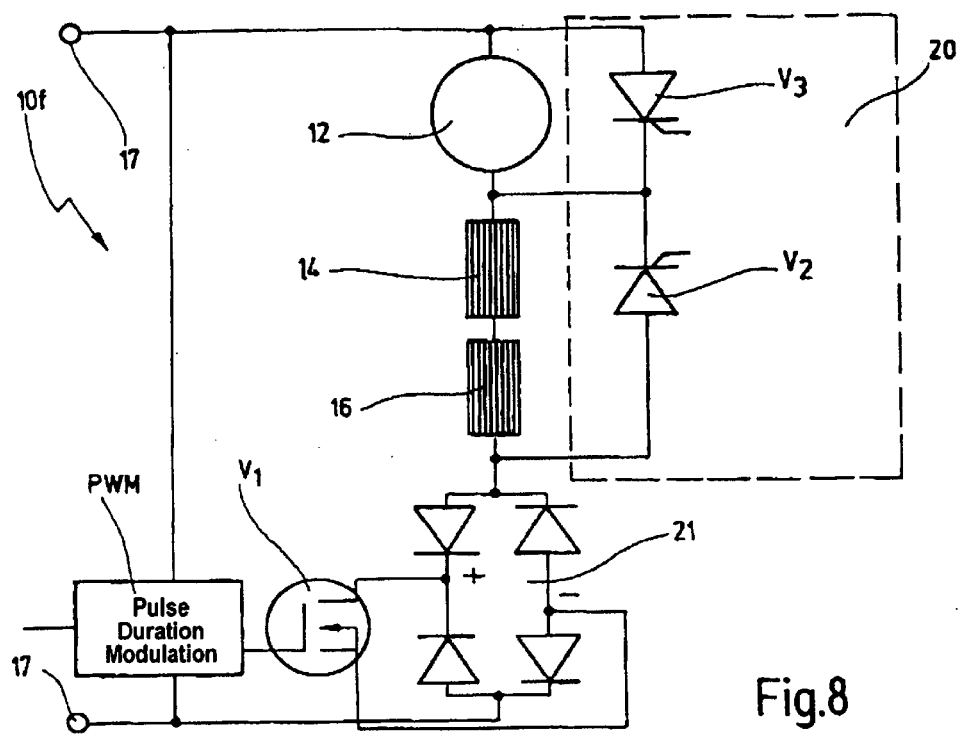
Figure 9:
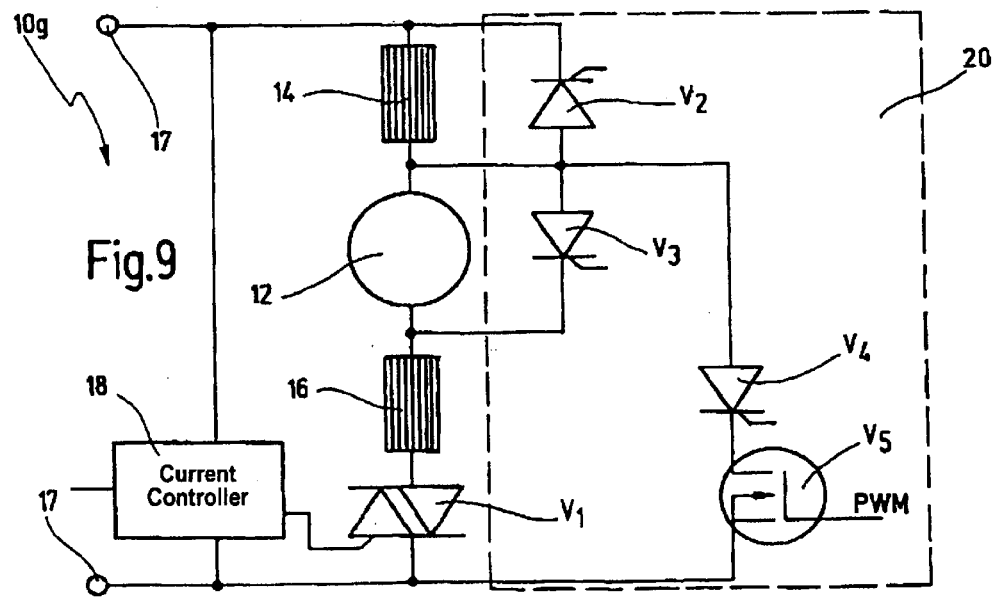
Figure 10:
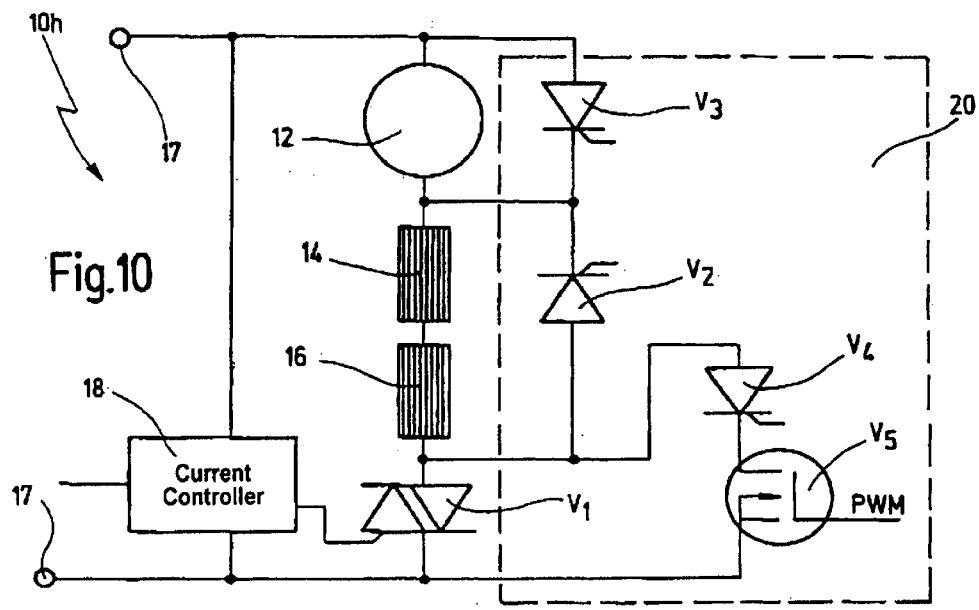
Figure 11:
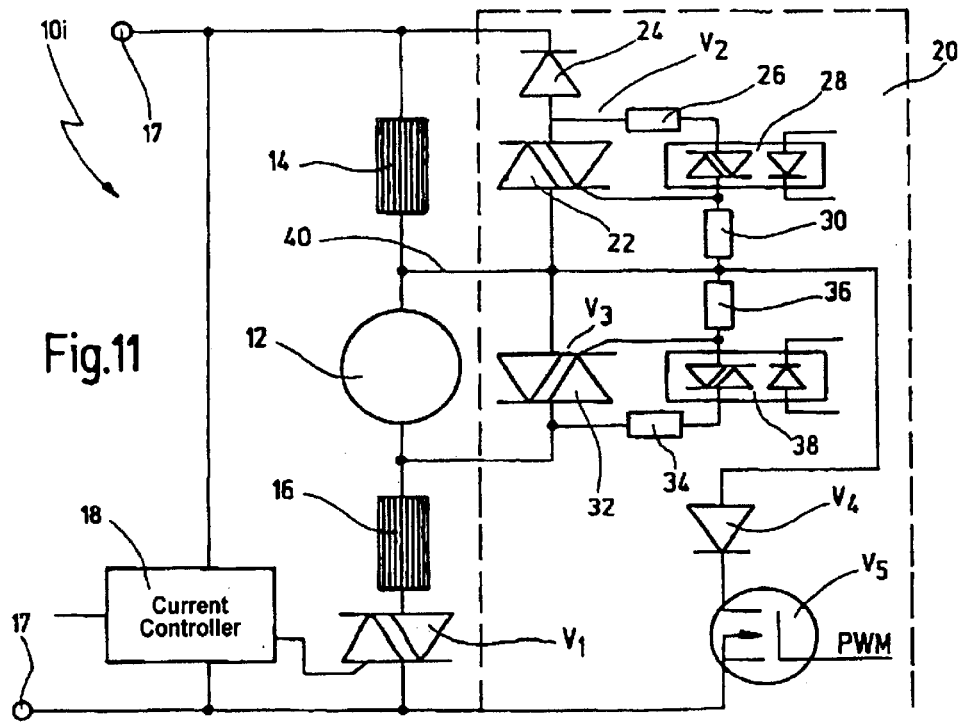
Figure 12:
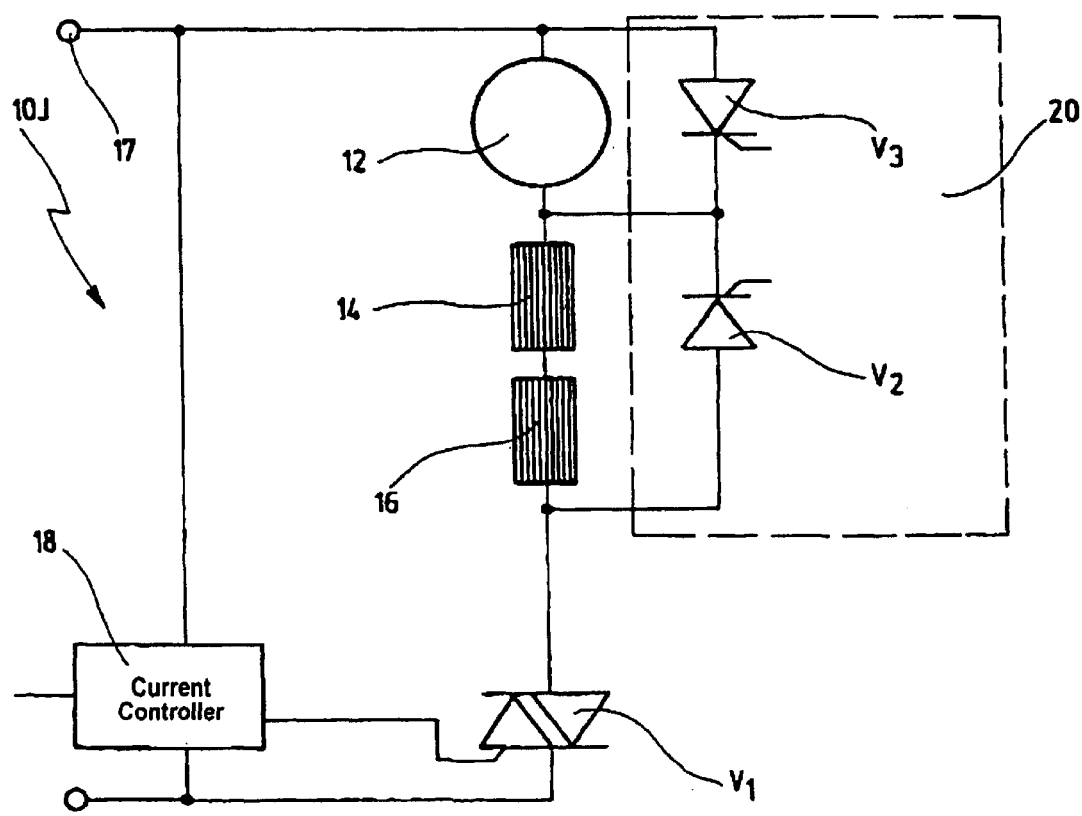
Figure 13:
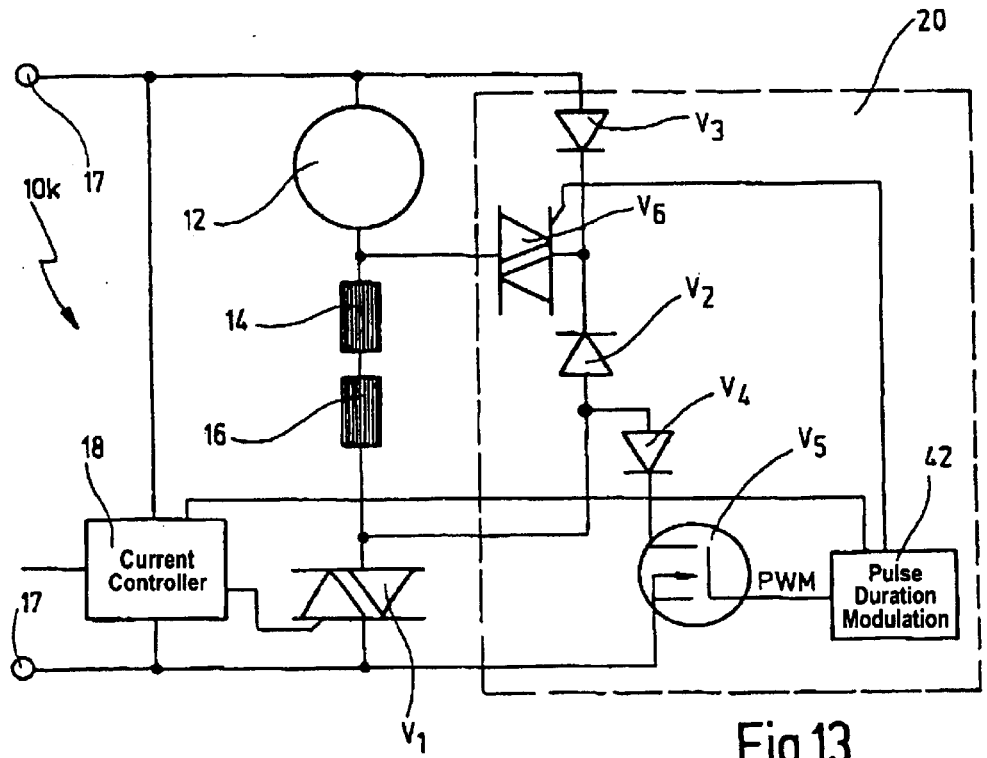
Figure 14:
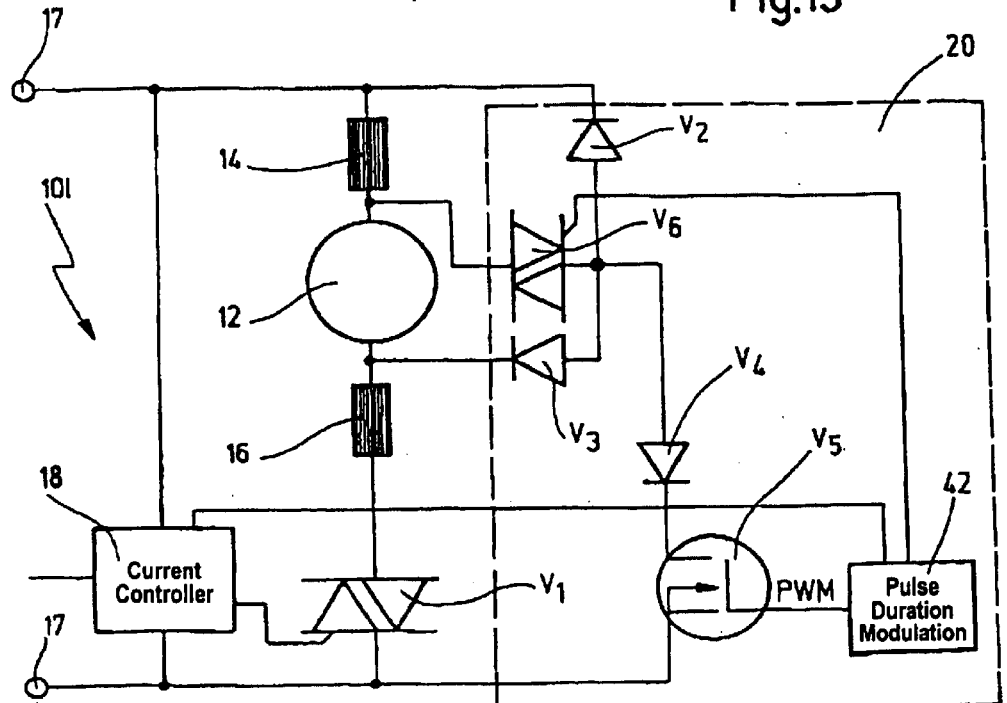
Figure 15:
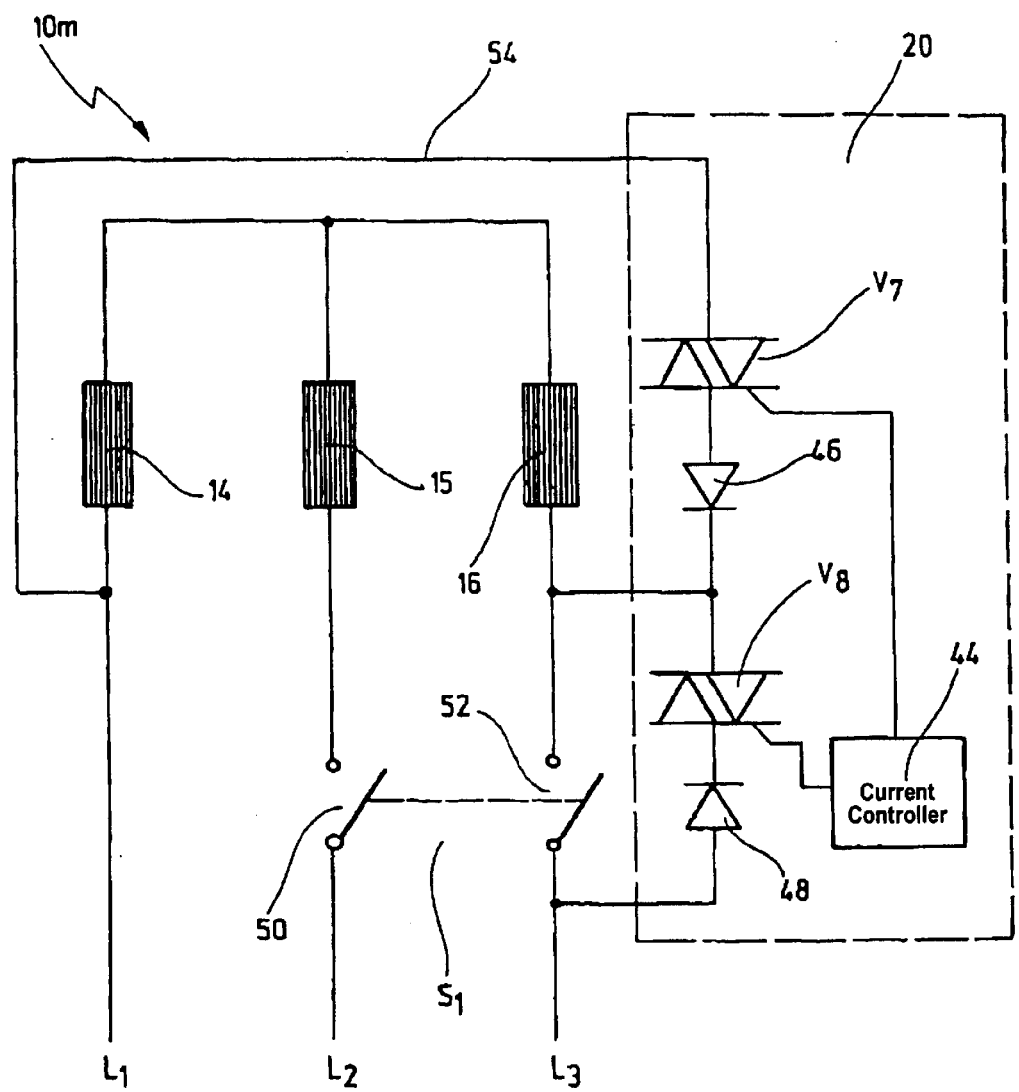

Further features and advantages of the invention will become apparent from the following description of preferred embodiments taken in conjunction with the drawings. In the drawings show:

FIG. 1 a first embodiment of an electric motor according to the invention being designed as a series motor, shown in extremely simplified representation;

FIG. 2 an electric motor according to FIG. 2 during braking mode;

FIG. 3 a further embodiment of a series motor according to the invention in extremely simplified representation;

FIG. 4 another embodiment of a series motor according to the invention utilizing a load resistance for limiting the excitation current;

FIG. 5 a modification of the embodiment according to FIG. 4, wherein, in addition, a supplementary excitation winding is provided, that is excited by means of the current flowing in the armature circuit during braking mode;

FIG. 6 a further modification of the embodiment according to FIG. 4, wherein, in addition, a supplementary excitation winding is provided in series with the load resistance;

FIG. 7 a further embodiment of a series motor according to the invention, wherein, for operating with direct current, a valve configured as a field effect transistor is provided for controlling the motor current during operating mode as well as for controlling the braking current during braking mode;

FIG. 8 a modification of the embodiment of FIG. 7 for operation with alternating current;

FIG. 9 a further modification of the series motor according to the invention comprising a phase current control for a operating mode and a pulse duration control for braking mode, given a symmetrical arrangement of the armature between two field windings;

FIG. 10 a modification of the embodiment according to FIG. 9 utilizing an asymmetric arrangement of the field windings;

FIG. 11 an embodiment of the circuitry of FIG. 9, reduced to practice, wherein both valves $V_2$, $V_3$ are configured as triacs driven by optical triacs;

FIG. 12 a modification of the embodiment according to FIG. 8, wherein instead of a pulse modulation control a phase current control is utilized for operating mode as well as for braking mode;

FIG. 13 a modification of the embodiment of FIG. 10, having two diodes and only one controllable electronic switch for braking control, shown in asymmetric configuration;

FIG. 14 a modification of the embodiment of FIG. 13, shown in symmetric configuration; and FIG. 15 an embodiment of an asynchronous motor according to the invention, comprising three poles and a braking circuitry having controllable electronic switches.

DETAILED DESCRIPTION OF THE PREFERRED EMBODIMENTS

An electric motor according to the invention may be utilized, for instance, for driving a retarded or electronically braked angle power tool, such as for operating a retarded or electronically braked angle grinder, a saw or the like.

In the beginning, the basic principle of the invention shall be discussed with respect to a series motor according to the invention, shown in FIGS. 1, 2 and 3 in simplified manner.

While FIG. 1 depicts a series-wound motor 10 during operating mode, FIG. 2 depicts the series-wound motor 10' during braking mode.

The series-wound motor 10 or 10', respectively, comprises two field windings 14, 16 and an armature 12, which comprises an armature winding connected in a known manner via brushes that are depicted only schematically in FIGS. 1 and 2.

The armature 12 is connected between the two field windings 14, 16 in series and may be connected via a switch $S_1$ (motor switch) with a supply voltage 17. In addition, a main switch $S_0$ may be provided for switching the complete motor on or off, being connected to supply voltage 17. Up to now, this is the known configuration of a series motor with a symmetric arrangement of the armature 12 between two field windings 14, 16.

According to the invention, now the possibility is provided to modify the series-wound motor 10 for braking in such a way that the arrangement of an externally excited direct current generator is reached, as shown in FIG. 2.

To this end, initially the current circuit via the two field windings 14, 16 and the armature 12 is interrupted by opening switch $S_1$. In addition, the armature 12 is shortened by means of a switch $S_2$ in parallel thereto, while the field winding 14 is connected via a switch $S_3$ to the other pole of the supply voltage, so that an external excitation results. It should be understood that the switches $S_2$, $S_3$ are open during operating mode, as to be seen from the representation of FIG. 1.

Since the series motor according to the invention is operated as an externally excited direct current generator, problems that occur with self-excited braking according to the prior art are completely avoided.

A generalized embodiment of the series motor 10 or 10', respectively, of FIGS. 1 and 2 is depicted in FIG. 3 and denoted in total with reference numeral 10a.

Again, the series motor 10a comprises an armature 12 and two field windings 14, 16 arranged in series. While in FIG. 3 a symmetric arrangement of the armature 12 is shown, wherein also the armature 12 is arranged between the two field windings 14, 16, basically also an asymmetric arrangement is possible, wherein the two field windings 14, 16 would be connected with each other and coupled at one end via the armature 12 to the supply voltage.

The switches $S_1$, $S_2$, $S_3$ shown in FIGS. 1 and 2 are shown in FIG. 3 in generalized form as any components that allow to control a current. Herein this may mean a complete disconnection, such as by means of a mechanical switch or a relay, or may mean a complete turning on, or any intermediate value. Therein, possibly a current limitation may be effected by means of a resistance or an inductance. Utilizing a semiconductor having a suitable control, such as a triac a thyristor, a transistor, in particular a field effect transistor, such a module can be affected utilizing electronic means only.

In addition to the embodiment according to FIGS. 1 and 2, the series motor 10a according to FIG. 3 comprises a further module $S_4$ that is connected in parallel to one field winding 14 and serves to limit the voltage across field winding 14 which may occur depending on the specific embodiment of module $S_3$. In case module $S_3$ should include fast electronic switches, such as a pulse duration modulation, then this may lead to detrimental voltage surges that can be limited by module $S_4$. Therefore, $S_4$ generally depicts a free wheeling valve for limiting voltage surges. This may be a diode in the simplest case.

After completion of braking, $S_3$ may be opened to completely disconnect the circuit from the supply voltage. This is applicable for all embodiments of the invention.

A series motor according to the invention may be designed cost-effectively and reliably by utilizing only few electronic components, as will be discussed with reference to the embodiments according to FIGS. 1 to 15 in the following.

Herein, the design may be chosen such that the braking electronics is separated from the motor electronics such that an existing motor may retrofitted with a braking circuitry. Practically, only one signal line between the motor electronics and braking electronics is necessary to activate the braking mode. For explanation, in the following designs the braking electronics is shown as a braking module 20 separately emphasized by a dashed line.

Herein, in different embodiments like reference numerals are utilized for similar parts whenever suitable.

In FIG. 4, a first one of these embodiments is depicted in total with reference numeral 10b.

The motor 10b comprises an armature 12, which is arranged symmetrically between two field windings 14, 16 in series. While one field winding 14 is directly connected to one pole of the supply voltage 17 at its end opposite the armature 12, the other field winding 16, at its end opposite the armature 12, is connected to the second pole of the supply voltage 17 by means of an electronic switch $V_1$ that is configured as a triac. The electronic switch $V_1$ is driven via a phase current control 18, as generally known in the art. Up to now, this circuitry corresponds to a series motor having field windings 14, 16, armature and electronic switch $V_1$ with phase current control 18 according to the prior art, shown in operating mode.

Now, according to the invention, a braking module designated in total with reference numeral 20 is provided, including two electronic switches $V_3$, $V_4$ and a load resistance $R_1$. The electronic switch $V_3$ is connected across the armature 12, the valve being configured in this case as a thyristor which may, for instance, be driven by an optical coupling device (not shown). The electronic switch $V_3$ allows to bypass the armature winding 12 in the manner discussed with respect to FIGS. 2 and 3. In addition, the electronic switch $V_4$ is connected between the armature 12 and the field winding 14, the electronic switch connecting the field winding 14 from one pole of the supply voltage 17 via a load resistance $R_1$ to the other pole of the supply voltage 17. The excitation current flows herein during braking mode.

Also this electronic switch $V_4$ may, for instance, be configured as a thyristor which may be driven by an optical coupling device (not shown).

When switching into the braking mode, firstly the electronic switch $V_1$ is opened and the electronic switches $V_3$, $V_4$ are switched on. Thus, the armature 12 and the electronic switch $V_3$ are shortened and the field winding 14 is externally excited by means of the supply voltage 17 via the electronic switch $V_4$ and the load resistance $R_1$. Since both electronic switches $V_3$, $V_4$ are also connected with their anodes between armature 12 and field winding 14, the reversal of the current flow direction within the armature is automatically provided when switching into braking mode.

While the two electronic switches $V_1$ and $V_3$ may be on/off switches in the easiest case, the electronic switch $V_4$ is configured as a switching element having a preferred direction, namely at least a mechanical switch or a relay in series with a diode. However, preferably the electronic switch $V_4$ is configured as an electronic component having a preferred direction and being switchable, such as a thyristor. The load resistance $R_1$ serves to limit the excitation current and may, for instance, be configured as a load resistance of about 150 watts, if the series motor 10b is, for instance, configured as a universal motor having a power of about 1,000 watts.

A modification of the series motor of FIG. 4 is depicted in FIG. 5 and designated in total with numeral 10c.

The single difference with respect to the series motor 10b rests in the fact that in the embodiment of FIG. 5, an additional excitation winding $L_1$ is connected in series with electronic switch $V_3$. By means of this additional excitation winding, in which the armature current flows during braking mode, the braking effect is enhanced. Due to this reason, the excitation current flowing via the field winding 14, the electronic switch $V_4$ and the load resistance $R_1$ can be reduced during braking mode, thus the load resistance $R_1$ may be designed with a larger resistance value, so that the power loss acting there-across is reduced.

A further modification of this embodiment is shown in FIG. 6 and designated in total with numeral 10d. The single difference with respect to the embodiment of FIG. 5 rests in the fact that instead of an additional excitation winding $L_1$, now an additional excitation winding $L_2$ lying in series with the electronic switch $V_4$ and the load resistance $R_1$ is provided.

Also in this way a stronger excitation is effected during braking mode, for which a smaller excitation current is sufficient.

A further embodiment of the series motor according to the invention is shown in FIG. 7 and designated in total with numeral 10e.

The circuitry shown is designed for operation with direct current, whereby a simplified design is reached. By contrast to the embodiments described before, herein both field windings 14, 16 are arranged asymmetrically with respect to the armature 12, which basically is also always possible with respect to the embodiments described before and to be described hereinafter.

For controlling the motor current as well as the braking current, an electronic switch $V_1$ is provided being designed as a field effect transistor connected with source and drain to the negative pole of the supply voltage 17 and the armature 12, respectively. The field effect transistor is driven at its gate by means of a pulse duration modulation PWM.

Again, in parallel to the armature 12, a controllable electronic switch $V_3$ is connected which may, e.g., be configured as a thyristor being connected with its cathode to drain of the field effect transistor $V_1$. To avoid excess voltages, which may arise from the fast switching of electronic switch $V_1$ by means of the pulse duration modulation, between drain of electronic switch $V_1$ and the positive pole of the supply voltage 17, a electronic switch $V_2$ is connected serving as a free wheeling electronic switch. In the case shown, the electronic switch $V_2$ is simply configured as a diode being connected with its cathode to the positive pole and with its anode to the cathode of electronic switch $V_3$ and the armature 12 and drain of electronic switch $V_1$ respectively.

The electronic switch $V_2$ configured as the diode, avoids the built up of excess voltages which might arise along the path formed by armature 12 and the two field windings 14, 16. During operating mode, the electronic switch $V_3$ is switched off, and the power is controlled by electronic switch $V_1$. When switching into braking mode, initially the electronic switch $V_1$ is switched off and thereafter the electronic switch $V_3$ is switched on with a time lag. Thereafter, the electronic switch $V_1$ is switched on for the duration of the braking phase, e.g., for three seconds, until the motor is idle. Thereafter, $V_1$ and $V_3$ are switched off. Then the braking phase ends.

In FIG. 8, a modification of the circuitry according to FIG. 7, designed for operation with alternate current, is depicted and designated in total with numeral 10f. The armature 12 is arranged asymmetrically with respect to the two field windings 14, 16 and is connected with one pole of the supply voltage 17. The two field windings 14, 16 lying in series with the armature 12 are connected at one end thereof to a bridge rectifier 21, the other alternate current input of which is connected to the other pole of the supply voltage 17. The electronic switch $V_1$, again configured as a field effect transistor, is driven at its gate by means of a pulse duration modulation PWM and is connected with its drain to the positive pole and with its source to the negative pole of the bridge rectifier 21.

For bypassing the armature 12, electronic switch $V_3$ is connected in parallel thereto, while the electronic switch $V_2$, which again serves as free wheeling electronic switch, is connected in parallel to the two field windings 14, 16. The electronic switch $V_2$, $V_3$, which again may be configured as thyristors, are poled in such a way that the two cathodes are connected with each other.

Again, during operating mode the two electronic switches $V_2$, $V_3$ are inactive, so that the braking module 20 is without any effect. Thus, during operating mode the motor 10$f$ is solely controlled by means of $V_1$ which is driven by means of the pulse duration modulation PWM. When switching into braking mode, initially the electronic switch $V_1$ is switched off. Thereafter, the electronic switches $V_2$, $V_3$ are switched on with a delay, and $V_1$ is switched on for the duration of braking, e.g. for 3 seconds, until the motor comes to a rest. Subsequently, $V_1$, $V_2$ and $V_3$ are switched off, this being the end of the braking phase.

A further embodiment of the motor according to the invention is shown in FIG. 9 and designated in total with numeral 10$g$.

Herein, a phase current control is utilized for controlling the motor 10$f$ during operating mode, as also being the case with respect to the embodiments of FIGS. 4 to 6.

For limiting the excitation current during braking mode, instead of a load resistance now a controllable electronic switch $V_5$ being configured as a field effect transistor is utilized, being driven at its gate by means of a pulse duration modulation PWM.

In the case shown, again a symmetric arrangement of the armature 12 between the two field windings 14, 16 is shown. While the one field winding 14 is connected to one pole of the supply voltage 17, the other field winding 16 is connected at its end opposite the armature 12 to the other pole of the supply voltage 17 by means of an electronic switch $V_1$ configured as a triac. The triac is driven by means of a phase current control 18.

For bypassing the armature winding 12 during braking mode, again a controllable electronic switch $V_3$ is provided, while across the field winding 14 a controllable free wheeling electronic switch $V_2$ is connected to limit any voltage surges at the field winding 14. For controlling the excitation current during braking mode, the electronic switch $V_5$ is provided which is configured as a field effect transistor and connected by means of a valve $V_4$ to the field winding 14 and to the armature 12 and the two electronic switches $V_2$, $V_3$, respectively. If the pulse duration modulation PWM can be switched off, then the electronic switch $V_4$ merely serves to provide the correct current direction to electronic switch $V_5$. Therefore, it may be a diode in the simplest case. If the pulse duration modulation is not configured for switching off, then the electronic switch $V_4$ is configured as a controllable electronic switch, as well as the two other electronic switches $V_2$, $V_3$, for instance as a thyristor. To guarantee a potential separation, again for driving the electronic switches $V_2$, $V_3$ and possibly $V_4$, an optical coupling device may be utilized.

As can be seen from FIG. 9, the electronic switches $V_2$, $V_3$, $V_4$ are each connected with its anode side between the field winding 14 and the armature 12.

During operating mode, the electronic switches $V_2$, $V_3$, $V_4$, $V_5$ are switched off, so that the known configuration of a series motor results which is controlled by means of electronic switch $V_1$, which may comprise a triac, in combination with phase current control 18. For switching into braking mode, initially $V_1$ is switched off by means of the phase current control 18, and the electronic switches $V_2$, $V_3$ are switched on with a certain time delay. Thereafter, the electronic switches $V_4$, $V_5$ are switched on for the duration of the braking phase, until the motor comes to a rest. Thereafter, the electronic switches $V_4$, $V_5$ and $V_2$, $V_3$ are switched off, whereby the braking phase ends.

In FIG. 10, a modification of the series motor of FIG. 9 is shown with asymmetric configuration of the armature 12 and depicted in total with 10$h$. Apart from the asymmetric configuration, the design and operation of the motor 10$h$ completely corresponds to the design described before with respect to FIG. 9. The armature 12 is connected to one pole of the supply voltage 17 and connected with its other end to the two field windings 14, 16 arranged in series. The end of the field winding 16 opposite the armature 12 is connected to the other pole of the supply voltage 17 by means of the electronic switch $V_1$ being configured as a triac. For control, again a phase current control 18 is provided. For bypassing the armature 12, a controllable electronic switch $V_3$, possibly being configured as a thyristor, is connected in parallel thereto. Across the two field windings 14, 16, the free wheeling electronic switch $V_2$ is connected with its cathode to the cathode of valve $V_3$ and to the armature 12 and the field winding 14, respectively. For controlling the excitation current through the field windings 14, 16 and the electronic switch $V_3$ during braking mode, again the electronic switch $V_5$, configured as a field effect transistor, is provided and being driven by means of a pulse duration modulation PWM and being connected between the triac and the field winding 16 by means of a electronic switch $V_4$. As described before, $V_4$ may be a simple diode, in case the pulse duration modulation PWM is configured for switch-off.

In FIG. 11, one possible reduction to practice of the motor of FIG. 9 is shown in more detail and depicted in total with 10$i$.

The basic configuration of motor 10$i$ is completely identical to the circuitry of the motor 10$g$ according to FIG. 9. Merely the electronic switches $V_2$, $V_3$, and $V_4$, which according to FIG. 9 were merely shown schematically, are now depicted in their actual configuration.

$V_4$ is configured as a simple diode, since $V_5$ can be switched off by means of the pulse duration modulation PWM. The two electronic switches $V_2$, $V_3$ are each configured as triacs, which each are driven by means of an optical triac.

The electronic switch $V_2$ (free wheeling valve) comprises a triac 22 which is connected between the armature 12 and the field winding 14 by means of a diode 24 which is connected with its cathode to the supply voltage 17. For driving the triac 22, an optical triac 28 is provided which is connected to the gate of triac 22 on the one hand and to the connection with the anode of diode 24 via a resistor 26 on the other hand. The optical triac 28 is connected via a resistor 30 to the line 40 which is connected to the anode of electronic switch $V_4$, the armature 12 and the field winding 14. The optical triac 28 is controlled by means of an LED.

In a corresponding manner, the electronic switch $V_3$ for bypassing the armature 12 comprises a triac 32 being connected in parallel to armature 12 between the line 40 and the connection to field winding 16. A diode in this circuit is superfluous. Again, the triac 32 is driven by an optical triac 38 which is connected to the gate of triac 32, is coupled to the line 40 via a resistor 36 and is connected via a resistor 34 to the connection of triac 32 to armature 12 and field winding 16. Again, for driving the optical triac, an LED is utilized.

Basically, also the triacs 22, 32 themselves could be configured as optical triacs, in case components with sufficient power are readily available. In the current case, the triacs 22, 32 are configured as power triacs, while the optical triacs 28, 38 are merely configured as control elements of small power.

The operation of motor 10$i$ according to FIG. 11 completely corresponds to the operation of motor 10$g$ according to FIG. 9.

Needless to say, for example also the motor 10$h$ of FIG. 10 could be designed in a corresponding manner with triacs and optical triacs, respectively, as previously described with respect to FIG. 11.

A modification of the embodiment of FIG. 8 is depicted in FIG. 12 and designated in total with 10$j$.

Herein, the pulse duration modulation of FIG. 8 was replaced by a phase current control 18. The latter controls the electronic switch $V_1$, now being configured as a triac, during operating mode as well as during braking mode. Naturally, the rectifier 21 is deleted herein. With respect to the reminder, the operation of this configuration completely corresponds to the operation explained before with respect to FIG. 8.

During operating mode, electronic switch $V_1$ is typically driven with both half waves. Herein, the phase control angle $\alpha$ is between 90° and 180°. By contrast, during braking mode only the positive half wave is passed, for instance with $\alpha$ of 160°.

The configuration according to FIG. 12 utilizes less components with respect to the configuration of FIG. 8, is space saving and has lower losses.

A modification of the embodiment of the motor of FIG. 10 is shown in FIG. 13 and designated in total with 10$k$.

Herein, the circuitry was simplified with respect to the embodiment of FIG. 10 by providing a electronic switch $V_6$, designed as a triac, connected between the wire connection between armature 12 or field winding 14, respectively, and the electronic switches $V_2$, $V_3$, which may be diodes, the electronic switch $V_6$ being driven by the control 42 of electronic switch $V_5$ (PWM). In this case, the electronic switches $V_2$, $V_3$ may be configured as simple diodes. Apart from this, the operation of this design completely corresponds to the one of FIG. 10.

In FIG. 14, a modification of the asymmetric design of FIG. 13 is shown as a symmetric design and designated in total with 10$l$. Apart from this, the operation completely corresponds to the design according to FIGS. 11 and 13, respectively.

Needless to say, the control 42 for the PWM, shown in FIGS. 13 and 14 separately, may be combined with the control 18 for $V_1$ and may, for instance, be configured as a microcontroller.

In FIG. 15, an embodiment of the electric motor according to the invention configured as an asynchronous motor is depicted and designated in total with 10$m$. The motor 10$m$ is a 3-phase motor comprising three field windings 14, 15, 16, arranged in star configuration and fed by phases $L_1$, $L_2$, and $L_3$ from the supply voltage at a frequency of, e.g., 300 Hz. The armature is configured as a squirrel cage rotor not shown here.

Due to the frequency which is higher than the mains frequency of 50 Hz, such a motor is also designated as a HF motor when used with regard to power tools (not to be confused with high frequency in the sense of electromagnetic waves in the MHz range or higher). Such HF machines are used for electric power tools that are extremely loaded continuously, since due to the lack of brushes they are maintenance-free.

For switching the motor 10$m$ on and off and for switching between operating mode and braking mode, a two-pole on/off switch $S_1$ having the poles 50 and 52 is provided. For braking the motor 10$m$, a braking circuit designated in total with 20 is provided. The braking circuit 20 comprises a electronic switch $V_8$ lying in series with a diode 48, and by means of which the two field windings 14, 16 are connected in series between the two phases $L_1$ and $L_3$, and thus being externally excited by means of a pulsating direct voltage, when the electronic switch $V_8$ is closed.

Simultaneously during braking mode, a electronic switch $V_7$ acting as a free wheeling electronic switch is closed across the two field windings 14, 16 via a line 54, the electronic switch being in series with a diode 46. By means of the free wheeling electronic switch $V_7$, a further rotation of the motor 10$m$ is avoided during braking mode.

As shown, the two electronic switches valves $V_7$, $V_8$ may be designed as triacs driven by means of a control 44.

During operating mode, both electronic switches $V_7$, $V_8$ are open and the switch $S_1$ is closed, so that the known circuit of a 3-phase asynchronous motor in star connection is given. For switching into braking mode, the switch $S_1$ is opened and both electronic switches $V_7$, $V_8$ are closed. While the electronic switch $V_7$ is fully opened, i.e. is operated at a phase current angle of 180°, the phase current angle of the electronic switches $V_8$ is, preferably, regulated by means of the control 44 to an intended value between 0° and 180°, to allow a control of the braking.

It will be understood that the electronic switches $V_7$, $V_8$ may also be chosen as valves controllable in any other way, such as transistors, in particular field effect transistors.

What is claimed is:

1. A system for operating an electric motor having a field winding and a commutating armature in an operating mode and a braking mode, comprising:

the commutating armature electrically connected on a first side to a supply voltage and on a second side to a first side of the field winding;

the field winding electrically connected on a second side to a side of a first triac;

said first triac electrically connected on a second side to the supply voltage;

a first controller, electrically connected to said first triac for controlling said first triac;

a first diode, a second triac and a second diode;

said first diode having an anode electrically connected to the first side of the commutating armature;

said second triac electrically connected on a first side to the second side of the commutating armature;

said second diode having an anode electrically connected to the second side of the field winding;

said first and second diodes having respective cathodes electrically connected to each other and electrically connected to a second side of said second triac; and a second controller, electrically connected to said second triac for controlling said second triac.

2. The system according to claim 1 wherein said first controller is a current control.

3. The system according to claim 1 wherein said second controller is a pulse duration modulation controller.

4. The system according to claim 1 further comprising:

a third diode and a field effect transistor;

said third diode having an anode electrically connected to the anode of said second diode and a cathode electrically connected to a source of said field effect transistor;

said field effect transistor having a drain electrically connected to the supply voltage and a gate electrically connected to said second controller.

5. The system according to claim 1 wherein the field winding comprises two field windings in series.

6. The system for operating an electric motor having at least two field windings and a commutating armature in an operating mode and a braking mode, comprising:

the first field winding electrically connected on a first side to a supply voltage and on a second side to a first side of the commutating armature;

the commutating armature electrically connected on a second side to a first side of the second field winding;

the second field winding electrically connected on a second side to a first side of a first triac said first triac electrically connected on a second side to the supply voltage;

a first controller, electrically connected to said first triac for controlling said first triac;

a first diode, a second triac and a second diode;

said first diode having an cathode electrically connected to the first side of the first field winding;

said second triac electrically connected on a first side to the second side of the first field winding;

said second diode having an cathode electrically connected to the second side of the commutating armature;

said first and second diodes having respective anodes electrically connected to each other and electrically connected to a second side of said second triac; and a second controller, electrically connected to said second triac for controlling said second triac.

7. The system according to claim 6 wherein said first controller is a current controller.

8. The system according claim 1 wherein said second controller is a pulse duration modulation controller.

9. A system according to claim 6 further comprising:

a third diode and a field effect transistor;

said third diode having an anode electrically connected to the anode of said second diode and a cathode electrically connected to a source of said field effect transistor;

said field effect transistor having a drain electrically connected to the supply voltage and a gate electrically connected to said second controller.

10. A system for operating an electric motor having a field winding and a commutating armature in an operating mode and a braking mode, comprising:

said at least one field winding electrically connected in series with said commutating armature;

a first triac electrically connected in series with said at least one field winding and said commutating armature, said first triac electrically connecting said armature and said field winding with a supply voltage when in the operating mode;

a first controller, electrically connected to said first triac for controlling the operation of said first triac;

a second triac, electrically connected to a connection point between the commutating armature and the field winding, said second triac electrically connecting said field winding to said supply voltage for externally exciting said field winding by means of said supply voltage while bypassing said armature;

a second controller configured as a pulse duration modulator, electrically connected to said second triac for controlling the operation of said second triac;

a diode, electrically connected across said field winding, said diode limiting the voltage across said field winding when in the braking mode.

* * * * *